US011003512B2

(12) United States Patent
Panikkar et al.

(10) Patent No.: US 11,003,512 B2
(45) Date of Patent: May 11, 2021

(54) SYSTEM AND METHOD FOR OPTIMIZING BULK DATA OPERATION

(71) Applicant: DELL PRODUCTS, LP, Round Rock, TX (US)

(72) Inventors: Shibi Panikkar, Bangalore (IN); Murali Devendranath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/594,652

(22) Filed: Oct. 7, 2019

(65) Prior Publication Data

US 2021/0103484 A1 Apr. 8, 2021

(51) Int. Cl.
  *G06F 3/00* (2006.01)
  *G06F 9/54* (2006.01)
  *H04L 29/06* (2006.01)
  *H04L 29/08* (2006.01)

(52) U.S. Cl.
  CPC ........ *G06F 9/542* (2013.01); *G06F 2209/541* (2013.01); *H04L 67/02* (2013.01); *H04L 67/28* (2013.01); *H04L 67/42* (2013.01)

(58) Field of Classification Search
  CPC ..................................... G06F 9/541
  USPC ......................................... 719/328
  See application file for complete search history.

(56) References Cited

U.S. PATENT DOCUMENTS

| | | | |
|---|---|---|---|
| 8,849,773 B2 | 9/2014 | Dinkar et al. | |
| 10,075,549 B2* | 9/2018 | Timiskov | H04L 67/10 |
| 10,176,081 B1* | 1/2019 | Webb | G06F 11/3495 |
| 10,567,551 B1* | 2/2020 | Nirodi | H04L 47/50 |
| 2005/0289002 A1* | 12/2005 | Mathis, Jr. | G06Q 30/0277 705/14.73 |
| 2009/0199012 A1* | 8/2009 | Yamada | H04L 63/10 713/176 |
| 2011/0225195 A1* | 9/2011 | Kubicki | G06F 16/951 707/776 |
| 2012/0084270 A1 | 4/2012 | Jayaraman et al. | |
| 2016/0217176 A1* | 7/2016 | Haviv | G06F 16/174 |
| 2017/0214759 A1 | 7/2017 | Timiskov et al. | |

OTHER PUBLICATIONS

Yanfang Ye, Combining File Content and File Relations for Cloud Based Malware Detection. (Year: 2011).*
Christophe Cérin, Efficient Data-Structures and Parallel Algorithms for Association Rules Discovery. (Year: 2004).*

* cited by examiner

*Primary Examiner* — Lechi Truong
(74) *Attorney, Agent, or Firm* — Larson Newman, LLP

(57) ABSTRACT

A system receives an initial application programming interface request for the bulk data operation from a client, and determines an optimal data size based on a tripping point. The system sends application programming interface requests that include the optimal data size, and combines responses to the application programming interface requests into a single response prior to transmission to the client via the receiver.

20 Claims, 8 Drawing Sheets

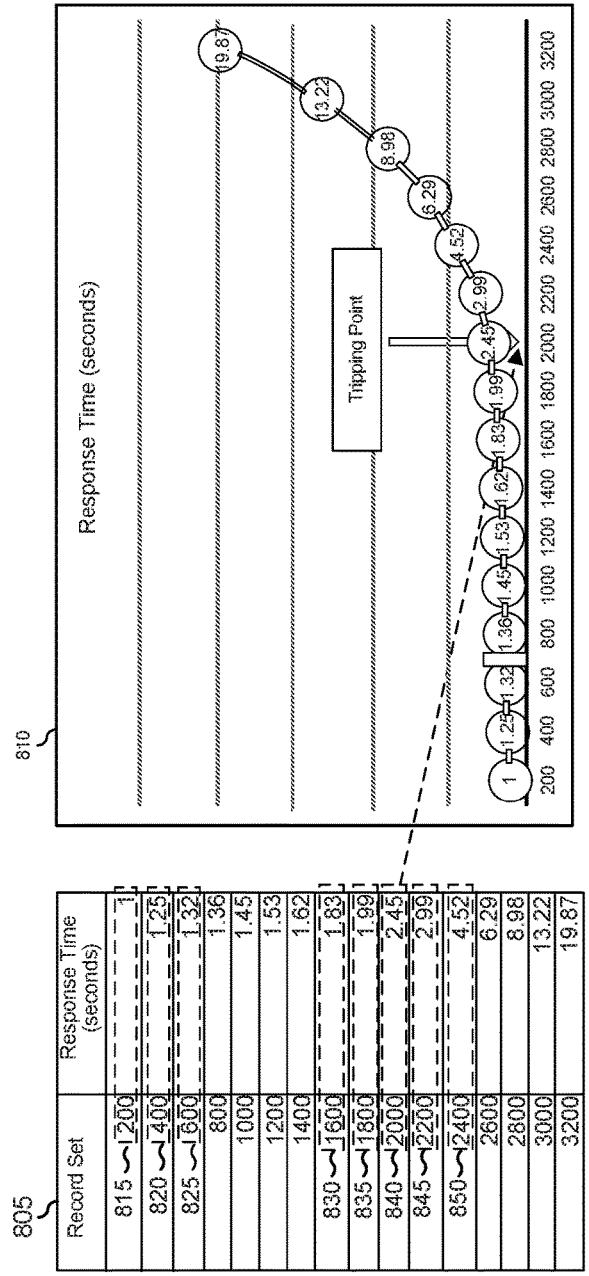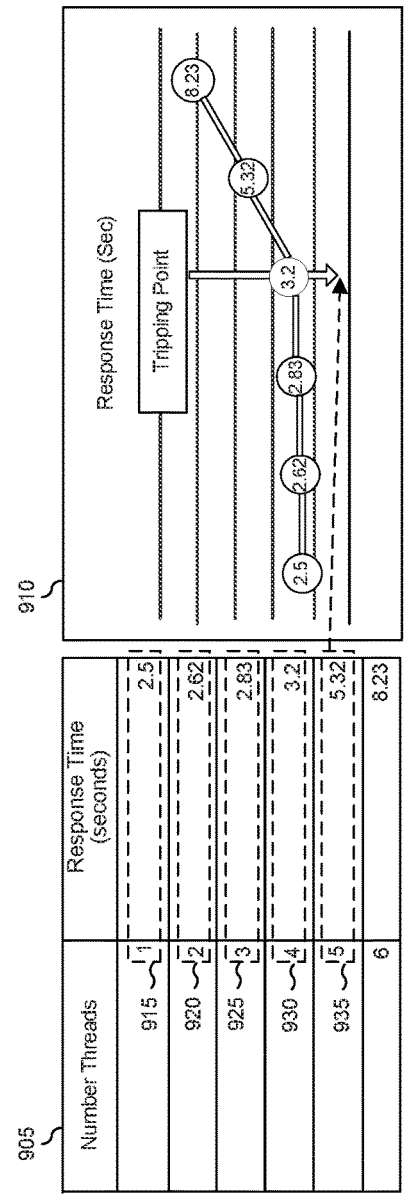
FIG. 8
FIG. 9

SYSTEM AND METHOD FOR OPTIMIZING BULK DATA OPERATION

FIELD OF THE DISCLOSURE

The present disclosure generally relates to information handling systems, and more particularly relates to optimizing bulk data operations.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system may receive an initial application programming interface request for the bulk data operation from a client, and determine an optimal data size based on a tripping point. The system may send application programming interface requests that include the optimal data size, and combine responses to the application programming interface requests into a single response prior to transmission to the client via the receiver.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8 is a block diagram illustrating a table and a graph for determining an optimal data size for optimizing bulk data operations, according to at least one embodiment of the present disclosure; and FIG. 9 is a block diagram illustrating a table and a graph for determining an optimal number of threads for optimizing bulk data operations, according to at least one embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
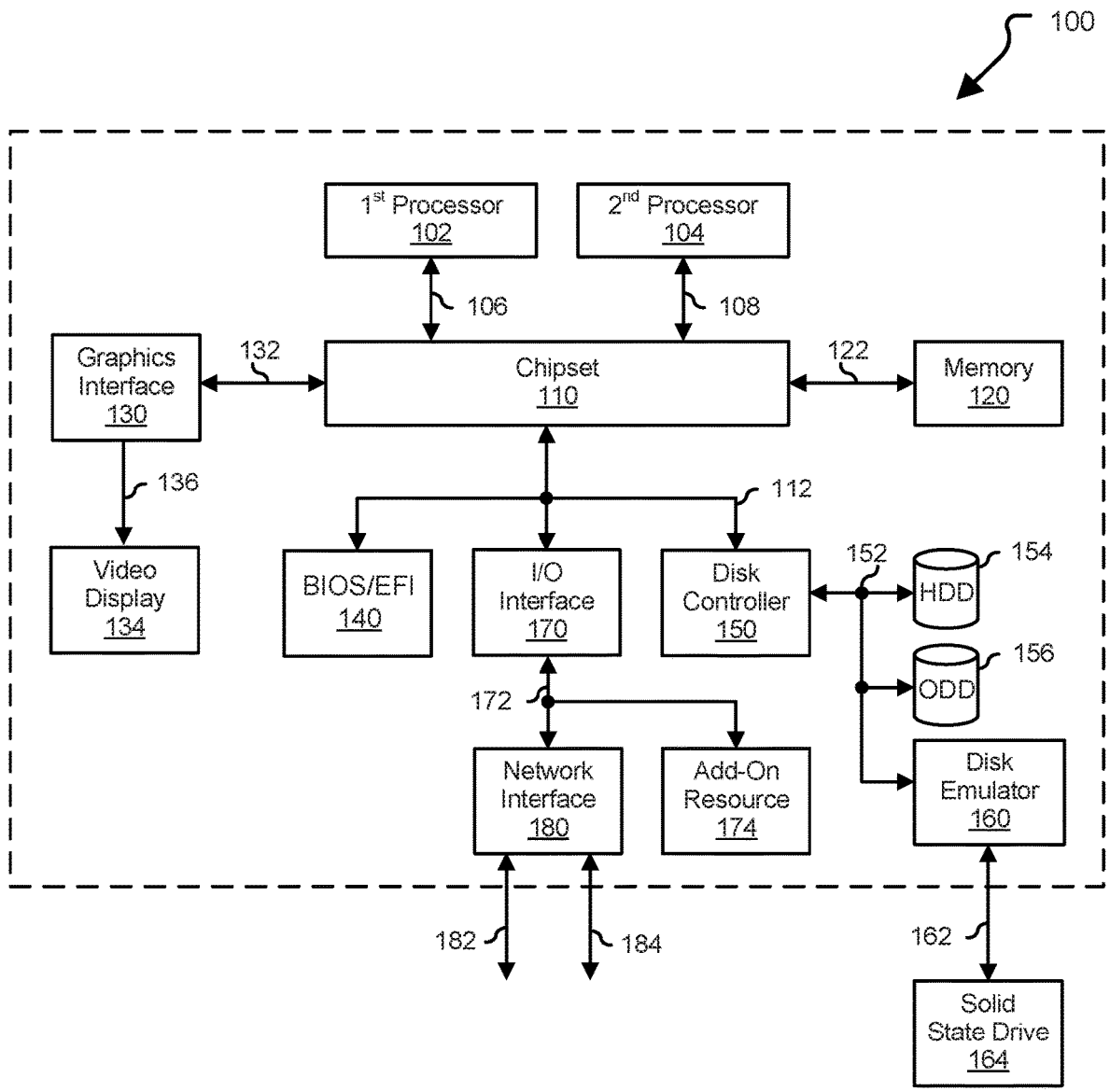
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Software as a Service (SaaS) has recently grown in popularity as a low-cost way for businesses to obtain the benefits of commercially licensed, internally operated software without the complexity and cost typically associated with obtaining and maintaining the software. SaaS applications are typically hosted from a centralized location and are available to customers via an application programming interface (API). The API may be a set of routines, protocols, and/or tools that specifies how software components interact which may adhere to standards such as hypertext transfer protocol (HTTP), representational state transfer (REST) style, and simple object access protocol (SOAP).

The API may be used to create, read, update, or delete a few records at a time or a large number of records, such as hundreds, thousands, or even millions of records. Processing a large number of records are often referred to as a bulk operation. Bulk operations may increase the likelihood of exceeding a timing or hardware limitation of a server hosting the application causing the bulk operation to fail due to reasons such as service timeouts, memory allocation failures, database wait timeouts, etc. Typically, in order to avoid exceeding the timing or the hardware limitation of the server, the client transmitting the request can break down the request into smaller groups of records and calling the API multiple times, often referred to as chunking. However, because the client is generally unaware of the capacity of the server or the timing and hardware limitations of the server, the client is basically guessing the size of the groups of items during the chunking process. Accordingly, it would be desirable to provide a system and method to determine the optimal data chunk size to be used during chunking. In addition, to determining the optimal data chunk size, the system and method may be configured to determine an optimal number of threads to further improve the performance of the bulk operation without causing a failure.

Figure 2:
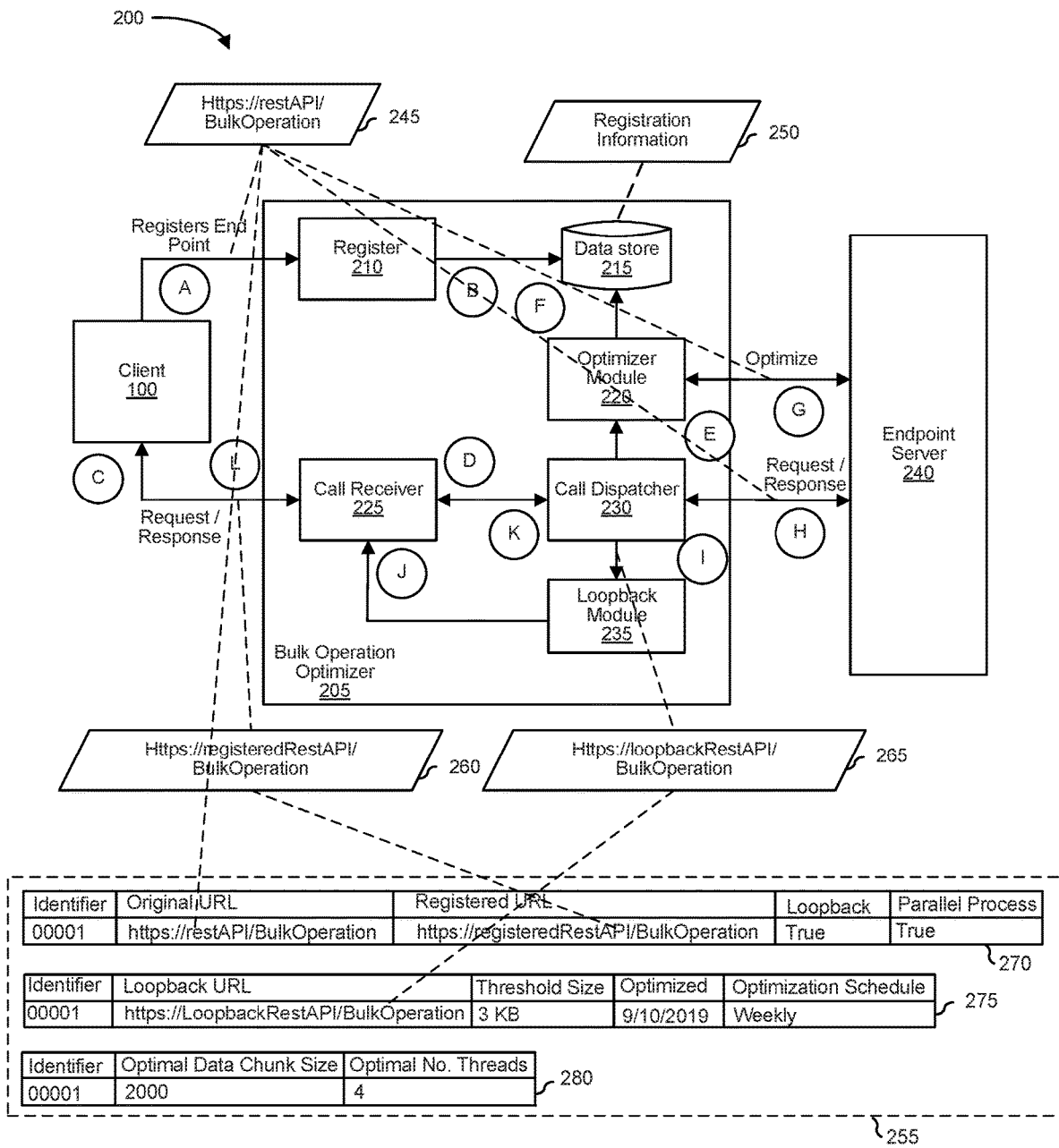
FIG. 2 is a block diagram illustrating a bulk operation optimizer system, according to at least one embodiment of the present disclosure.

FIG. 2 shows a computing environment 200 for optimizing or improving bulk data operations that includes information handling system 100 also referred to as a client 100, a bulk operation optimizer 205, and an endpoint server 240. Bulk operation optimizer 205 includes a register 210, a data store 215, an optimizer module 220, a call receiver 225, a call dispatcher 230, and a loopback module 235.

Client 100 is generally configured to submit an API request to endpoint server 240 and bulk operation optimizer 205. Client 100 is also generally configured to receive a response to the API request from endpoint server 240 and bulk operation optimizer 205. In certain embodiments, client 100 may be a personal computer such as a desktop computer or a portable computer. Client 100 may also be a mobile device such as a smartphone, a tablet computer, a personal digital assistant, a cellular phone, etc. Although FIG. 2 is depicted as having one client, FIG. 2 may include any suitable number of clients. Client 100 may implement a substantially arbitrary operating system having HTTP or HTTP secure (HTTPS) communication capabilities.

Bulk operation optimizer 205 may be configured to function as a proxy between client 100 and endpoint server 240 that provides access to a service, such as a database or a cloud service hosted by endpoint server 240, via the API. As a proxy, bulk operation optimizer 205 can receive API requests of bulk operations from the clients and optimize the bulk operations when submitting to the endpoint servers such as to improve the performance of the bulk operations or prevent a failure associated with the bulk operations. Bulk operation optimizer 205 may be executed on the same computing device as endpoint server 240.

Endpoint server 240 is generally configured to communicate to bulk operation optimizer 205 and client 100. Endpoint server 240 may host an application or service that is configured to provide access to the application or service via an API. The API may be used by which client 100 to submit a request and receive a response. Endpoint server 240 is generally configured to handle bulk operations.

Register 210 may be configured to allow a client to register an endpoint uniform resource locator (URL). During the registration process, the client can opt for loopback and/or for parallel processing. If the client opts for the loopback, then the client may also identify a loopback threshold. The loopback threshold may be set to a fraction of the expected responses to be received or all of the expected responses. Register 210 stores registration information 250 in a data store 215. Registration information 250 or a portion thereof may be generated after registering the endpoint URL.

Registration information 255 is a detailed illustrative example of registration information 250. As shown registration information 255 includes a table 270, a table 275, and a table 280. Table 270 includes a unique identifier generated for the endpoint URL. Table 270 also includes a registered URL and flags to identify whether the loopback option and parallel processing options are selected. Table 275 includes a loopback URL and a loopback threshold size if the loopback option has been selected. Table 275 may also include information on whether the bulk operation associated with the endpoint URL has been optimized and an optimization schedule if available. Table 280 includes information regarding the optimal data chunk size and the optimal number of threads for the bulk operation. Registration information 255 may include more or less information and/or tables as shown. Because registration information 255 is for illustration purposes, information shown is simplified to facilitate ease of illustration and/or understanding.

Data store 215 may be any suitable storage device such as a rotating disk drive, flash-based storage, and the like. The particular data store as described in this embodiment, or a particular device thereof, such as a rotating disk or solid-state storage device (such as a flash-based storage device), should not be construed as a limitation.

Call receiver 224 may be configured to receive API requests from one or more clients, wherein the API requests use the registered URLs. Call receiver may generate a globally unique identifier such as a transaction identifier for each API request. Call receiver 225 may also be configured to receive responses from the API requests from call dispatcher 230 and loopback module 235. Call receiver 224 may be configured to transmit the responses to the clients. Call receiver 224 may be configured to receive traffic to all registered endpoint URLs.

Optimizer module 220 may be configured to determine an optimal configuration for the bulk operation. The optimal configuration may include an optimal data chunk size and an optimal number of threads for synchronous processing of the API requests associated with the bulk operation. Because servers such as endpoint server 240 can host one or more applications or services and each application or service hosted by endpoint server 240 have different capabilities, each one of application or service can handle different optimal data chunk size or an optimal number of threads. Further, because the endpoint server 240 may be processing one or more bulk operations at any time, the optimal data chunk size or the optimal number of threads for a particular bulk operation determined at a prior time may be different to the optimal data chunk size or the optimal number of threads that the endpoint server can handle at the current time. Thus, it may be desirable to determine whether to re-optimize the bulk operation and accordingly perform a re-optimization process.

The re-optimization may be performed periodically or according to a schedule. In another embodiment, re-optimization may be performed dynamically after detection of a deterioration of the performance of the bulk operation. For example, if the bulk operation typically finishes processing after six seconds but the current bulk operation is still processing after eight seconds, then optimizer module 220 may be flagged for re-optimization. In yet another embodiment, optimizer module 220 may be configured to may determine whether to re-optimize based an optimization policy. The re-optimization policy may be pre-defined by an administrator during registration or learned by a machine learning algorithm. For example, the client may choose to re-optimize periodically, such as weekly, monthly, quarterly, etc. The optimization policy may include one or more rules regarding re-optimization such as whether to re-optimize based on the remaining size of the data to be processed and/or whether a failure has been encountered with the current bulk operation.

Optimizer module 220 may be configured to keep track of response times and other relevant information for each registered URL to aid in the optimization process. For example, optimizer module 220 may determine an average response time, a mean response time, a median response time for a certain size of data in the request. Optimizer module 220 may compare the current response time to a previous response time such as the average response time. If the current response time exceeds the average response time, optimizer module 220 may determine whether the current response time exceeds a pre-defined threshold. If the current response time exceeds the pre-defined threshold, then the optimizer module 220 may optimize the bulk operation associated with the registered endpoint URL.

Call dispatcher 230 may be configured to utilize optimizer module 220 to determine whether a bulk operation associated with the endpoint URL such as an endpoint URL 245 has been optimized. If the bulk operation associated with the endpoint URL is optimized, then call dispatcher 230 performs bulk API request according to an optimization configuration. A bulk API request is usually a bundle of entries that we want to apply the same functionality in one API request. For example, add thousands of new customers to a database. The optimization configuration may include an optimal data chunk size and an optimal number of threads. If the bulk operation associated with the endpoint URL is not optimized, then call dispatcher 230 utilizes optimizer module 220 to optimize the bulk operation.

Call dispatcher 230 may be configured to route responses received to the bulk API request to call receiver 225. In another embodiment, call dispatcher 230 may also be configured to reroute responses received to loopback module 235.

Loopback module 235 may be configured to keep track of the re-routed responses from call dispatcher 230 and combine the responses until the loopback threshold is reached. After reaching the loopback threshold, loopback module 235 may transmit the responses to call receiver 225. Loopback module 235 may be configured to publish information regarding the responses such as number of responses received, number of successful responses, etc. to a status manager (not shown) allowing for asynchronous communication to the client. Typically, the client is unaware of the status of the bulk operation during its processing. However, by querying the status manager, the client may be updated regarding the current status of the bulk operation.

FIG. 2 is annotated with a series of letters A-L. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a user such as an administrator of client 100 registers an endpoint URL such as endpoint URL 245 at register 210. The user may opt for loopback and/or parallel processing. If the user opts for loopback, then register 210 may determine a loopback URL 265. The user may also determine a loopback threshold when opting for the loopback. As used herein, the loopback threshold may refer to the number of records or data size to be met at loopback module 235 prior to sending the responses to call receiver 225.

At stage B, register 210 may generate a unique registration identifier and a registered endpoint URL 260 based on endpoint URL 245. During the registration, register 210 may bind endpoint URL 245 to registered endpoint URL 260 and loopback URL 265. Registered endpoint URL 260 is a standard URL associated with bulk operation optimizer 205. Register 210 may store information associated with the registration, such as registration information 250 in data store 215. Registration information 255 is a more detailed representation of registration information 250. Registration information 255 may include information not shown in FIG. 2.

At stage C, client 100 sends an API request for a bulk operation to call receiver 225. Client 100 may send the API request using registered endpoint URL 260. At stage D, call receiver 225 routes the API request to call dispatcher 230. At stage E, call dispatcher 230 may determine whether the bulk operation using registered endpoint URL 260 has been optimized via optimizer module 220.

At stage F, optimizer module 220 queries data store 215 to determine whether the bulk operation associated registered endpoint URL 260 has been optimized. In particular, optimizer module 220 may query registration information 255. If optimizer module 220 determines that the bulk operation is optimized, then optimizer module 220 transmits optimization configuration to call dispatcher 230 and proceeds to stage H. Otherwise, the process proceeds to stage G. Optimization configuration may include the optimal data chunk size and the optimal number of threads for parallel processing. At stage G, optimizer module 220 starts optimization process. After the bulk operation has been optimized, the process proceeds to stage H. At stage H, call dispatcher 230 sends the API request for the bulk operation using endpoint URL 245 to endpoint server 240 based on the optimization configuration.

At stage I, if the loopback option was chosen, then call dispatcher 230 re-routes responses received from endpoint server 240 to loopback module 235 using loopback URL 265. At stage J, after reaching the loopback threshold, loopback module 235 sends the responses to call receiver 225. If the loopback option was not chosen, then at stage K, call dispatcher 230 sends the responses received from endpoint server 240 to call receiver 225. At stage L, call receiver 225 combines the responses to a single response then transmits the single response to client 100.

Figure 3:
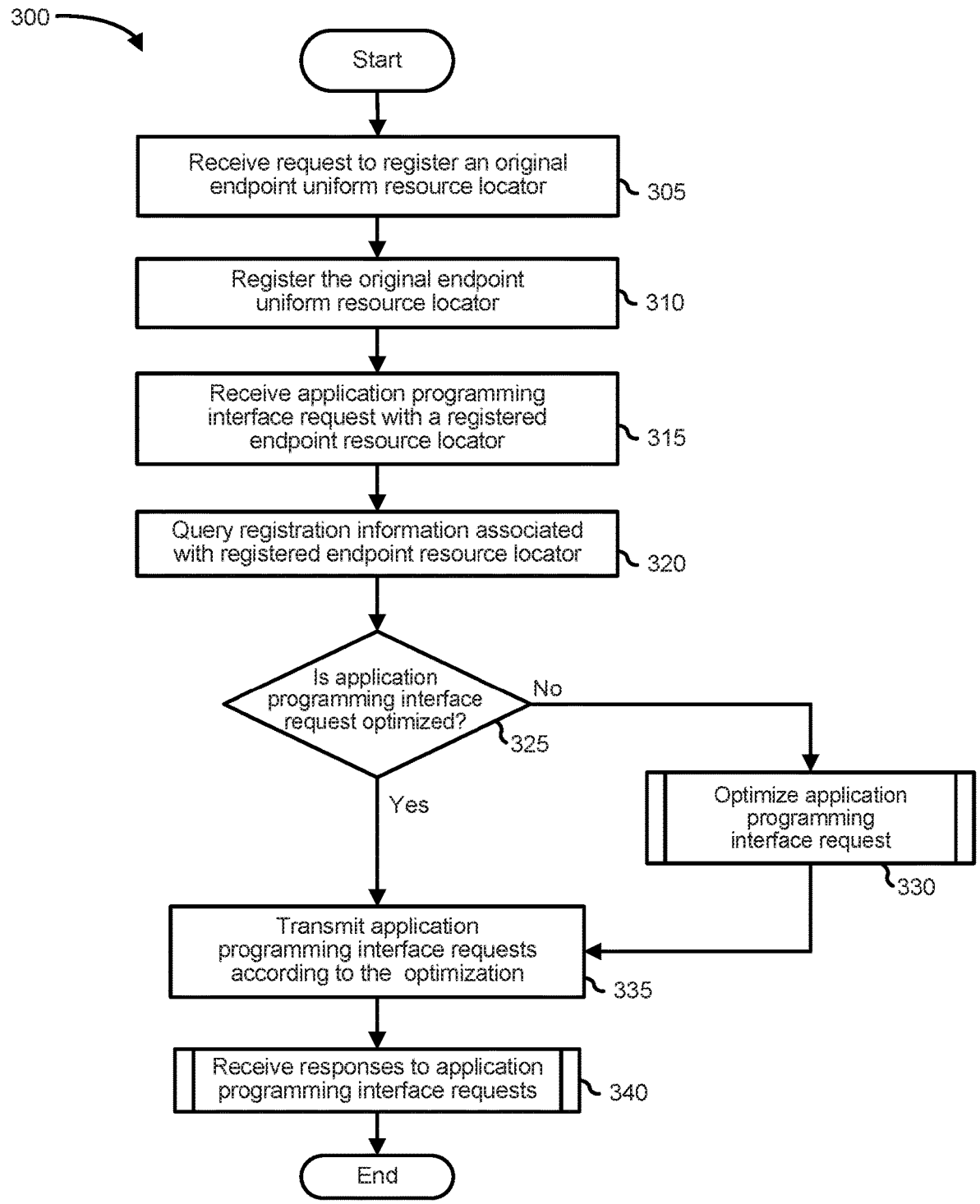
FIG. 3 is a flow diagram illustrating a method of optimizing bulk data operations, according to at least one embodiment of the present disclosure.

FIG. 3 shows a method 300 for optimizing a bulk data operation. The method 300 may be performed by one or more components of FIG. 2. The method 300 typically starts at block 305 where the method receives a request to register an endpoint URL also referred to as an original endpoint URL. The endpoint URL may be directed to an application or web service hosted by an endpoint server. After receiving the request, the method proceeds to block 310.

At block 310, the method processes the request and registers the original endpoint URL. During the registration, the method may bind the original endpoint URL with a registered endpoint URL and return the registered endpoint URL to the client. The registered endpoint URL is associated with a bulk operation optimizer which acts as a proxy between the client and the endpoint server. The method proceeds to block 315. At block 315, the method receives an API request for a bulk operation using the registered endpoint URL. The bulk operation includes a data set for processing. The data set may also be referred to as data payload and may include a large number of records such as in the hundreds, thousands, or millions of records. The API request is also referred herein as an initial API request and the data set as an initial data set. The method proceeds to block 320.

At block 320, after receiving the initial API request, the method may parse the registered endpoint URL to identify information such as a protocol, a hostname, a port, a file name, etc. The method may use this information to query data store 215 to determine the registration information associated with the registered endpoint URL such as the original endpoint URL, whether the bulk operation associated with the initial API request has been optimized, the optimal data size, the optimal number of threads, etc. The method may also generate a unique transaction identifier for the initial API request. The method proceeds to block 325.

At block 325, the method determines whether the bulk operation has been optimized. If the bulk operation has been optimized, then the method proceeds to block 335. Otherwise, the method proceeds to block 330. At block 330, the method optimizes the bulk operation. Optimization may include determining an optimal data size for the bulk operation based on a tripping point which includes determining the largest data size that an application program can handle in a sequential API request before a response time exceeds a threshold. The optimization may also include determining a tripping parallel process based on the optimal data size which includes determining the highest number of threads the application can handle before the response time exceeds the threshold. The optimization process may also be referred to as calibrating the API handling the bulk operation. A re-calibration may be performed based on one or more factors such as change in one or more parameters associated with the API request. After the optimization, the method proceeds to block 335.

At block 335, the method transmits the initial API request according to the determined optimization process. The method may divide the initial API request into one or more bulk API requests, wherein each bulk API request includes a portion of the data set based on the optimal data size determined above. In addition, each bulk API request may include information such as the transaction identifier that links the bulk API requests to the initial API request. The method proceeds to block 340. At block 340, the method receives responses to the bulk API requests. The method may combine the responses to a single response prior to transmitting the single response to the client. The method ends.

Figure 4:
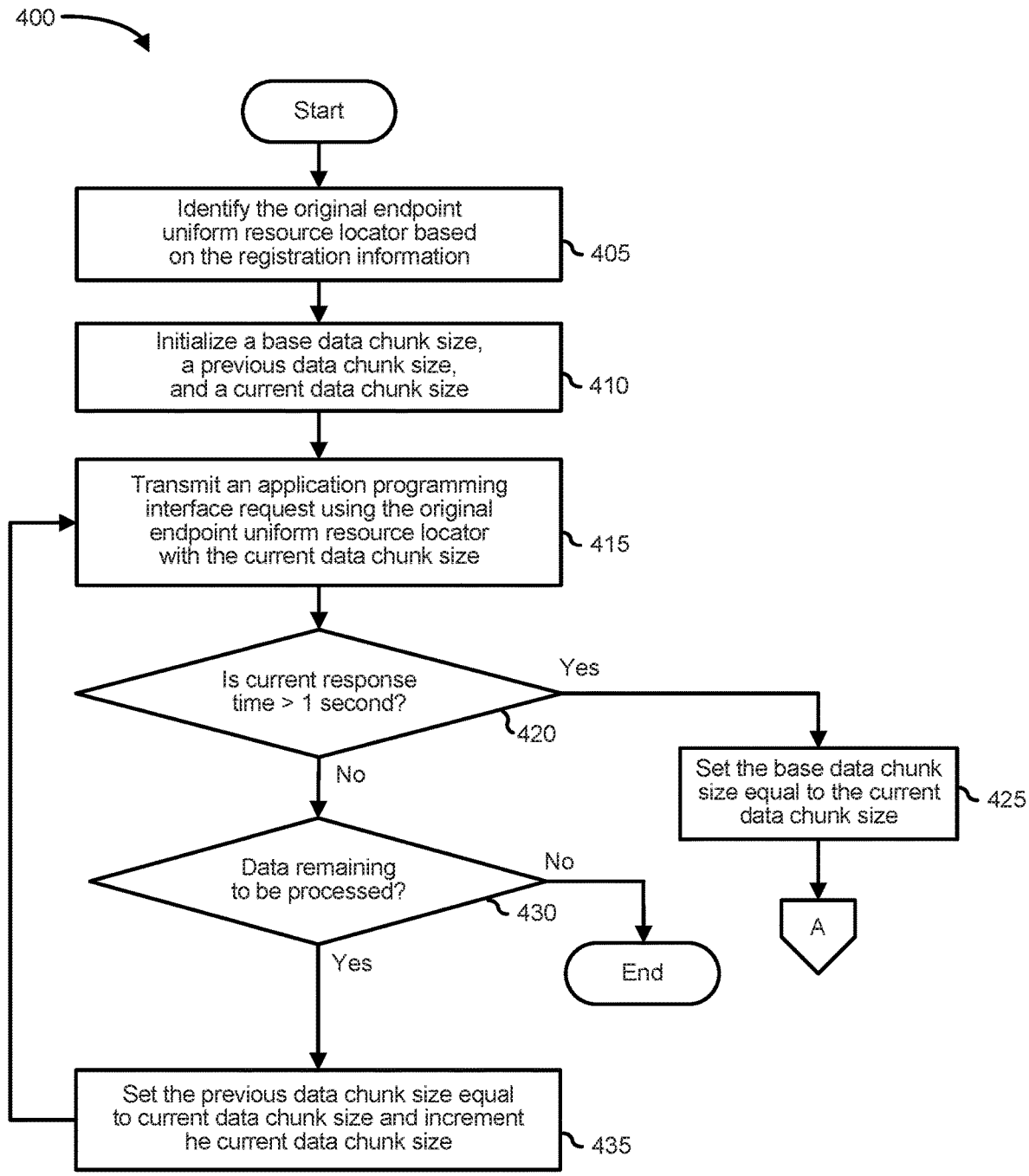
FIGS. 4 and 5 are flow diagrams illustrating a method for determining an optimal data size for optimizing bulk data operations, according to at least one embodiment of the present disclosure.

FIG. 4 shows a method 400 for determining the optimal data size for the initial API request. Method 400 is a detailed illustration of block 330 of FIG. 3. The method 400 may be performed by one or more components of FIG. 2 such as optimizer module 220. The method typically starts at block 405 where the method identifies the original endpoint URL based on the registration information queried in block 320 of FIG. 3. The method proceeds to block 410.

At block 410, the method initializes values associated with one or more parameters used during the optimization process. For example, the method may initialize a base data chunk size parameter and a current data chunk size parameter to the value of one. The value of one may refer to a number of records or the size of the data such as in bytes. The method proceeds to block 415. At block 415, the method submits a bulk API request using the original endpoint URL. The bulk API request is a bulk operation that includes a data set of the current data chunk size. The data set is a subset of the initial data set. In this example, the current data chunk size is one record. The method proceeds to block 420.

At block 420, the method receives a response to the bulk API request and determines whether the response time is greater than one second. The response time may also be referred to as the current response time. If the current response time is greater than one second, then the method proceeds to block 4245. If the current response time is less than or equal to one second, then the method proceeds to block 430.

At block 425, the method sets the base data chunk size equal to the current data chunk size. The method proceeds to block 505 at FIG. 5. At block 430, the method determines if there is data remaining to be processed from the initial data set. If there is data remaining to be processed, then the method proceeds to block 435. Otherwise, the method ends. Prior to the end of the method, the method may set the status to show that there are not enough records in the data set to be processed to determine an optimal data chunk size.

At block 435, the method increments the current data chunk size. The method may increment the current data chunk size according to a pre-determined value. For example, the method may increment the current data chunk size by a factor of two. After incrementing the current data chunk size, the method proceeds to block 415.

Figure 5:
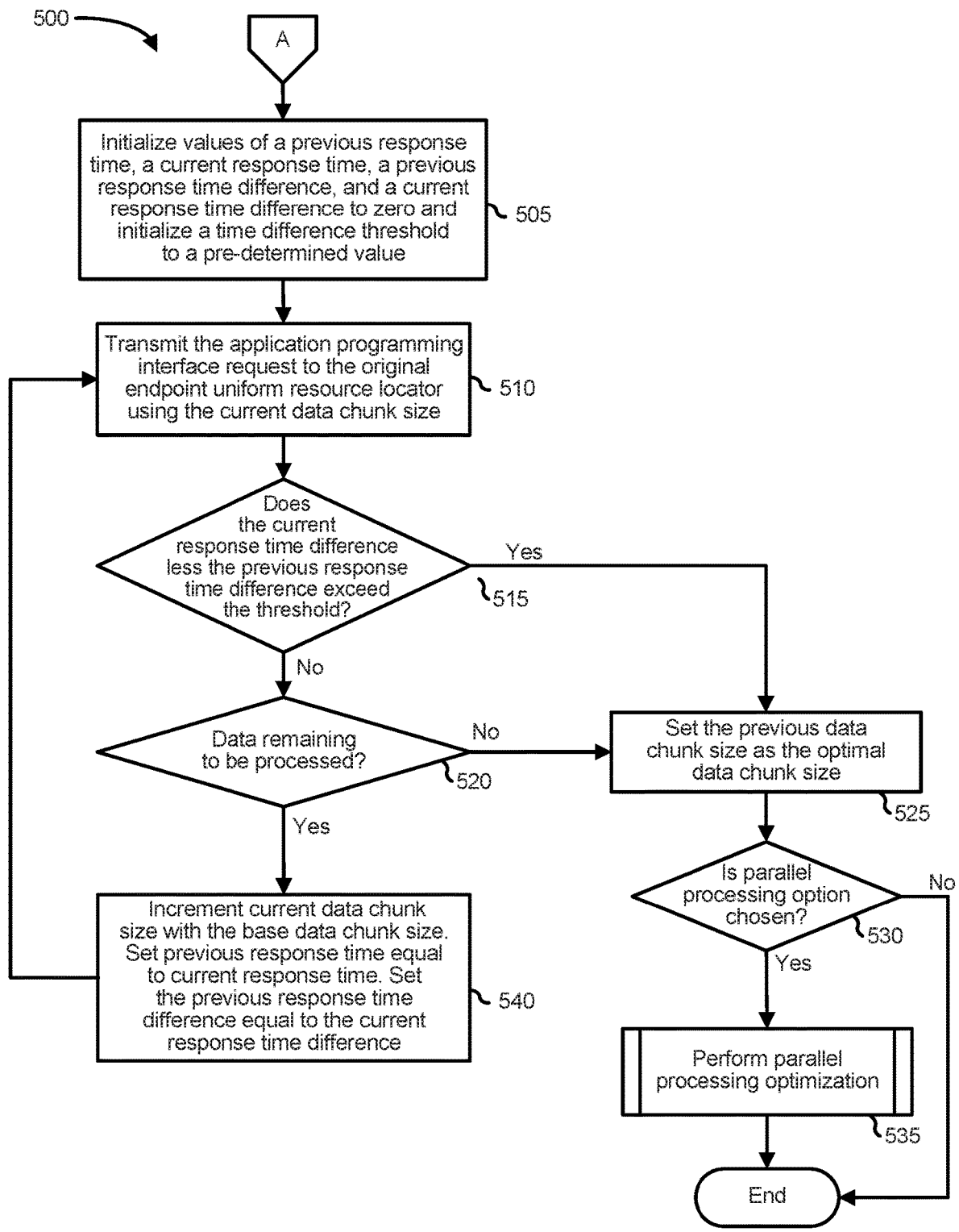

FIG. 5 shows a method 500 that is a continuation of method 400. The method typically starts at block 505 where the method initializes values associated with one or more parameters used during the optimization process. For example, the method may initialize a previous response time parameter, a current response time parameter, a previous response time difference parameter, and a current response time difference parameter to zero. The method may also initialize a value of a time difference threshold parameter which may be pre-defined by an administrator. As used herein, the time difference threshold parameter may be an allowable variation of response times, which is the response time prior to reaching a tripping point. After initializing the values of the aforementioned parameters, the method proceeds to block 510.

At block 510, the method transmits a bulk API request using the original endpoint URL also referred to as API request. The API request includes a batch of data of the current data chunk size from the initial data set. The method proceeds to block 515. At block 515, the method receives a response to the API request. The method may determine the current response time difference by determining the difference or change between the current response time and the previous response time. The method may determine whether the current response time difference exceeds the time difference threshold. The tripping point may have been reached if the current response time difference exceeds the time difference threshold. The tripping point may be referred to as the point at which a series of small changes in the response time becomes significant enough to cause a larger change in the response time. In other words, at some point, the data chunk size may cause a significant change in the response time in the bulk API request, reaching the tripping point. If the current response time difference is greater than the time difference threshold then the method proceeds to block 525. Otherwise, the method proceeds to block 5250.

At block 520, the method determines if there is data from the initial data set to be processed. If there is data remaining to be processed, then the method proceeds to block 540. Otherwise, the method proceeds to 525. At block 530, the method determines if the parallel processing option was chosen during the registration. The method may query the data store and retrieve the registration information to determine whether the parallel processing option was chosen. If the parallel processing option was chosen then the method proceeds to block 535. At block 535, the method performs a parallel processing optimization to determine the number of parallel processes to synchronously send the API requests. Otherwise, the method ends.

At block 540, the method increments the current data chunk size with the base data chunk size. The method may also set the previous response time equal to the current response time. In addition, the method may set the previous response time difference equal to the current response time difference. The method proceeds to block 510.

Figure 6:
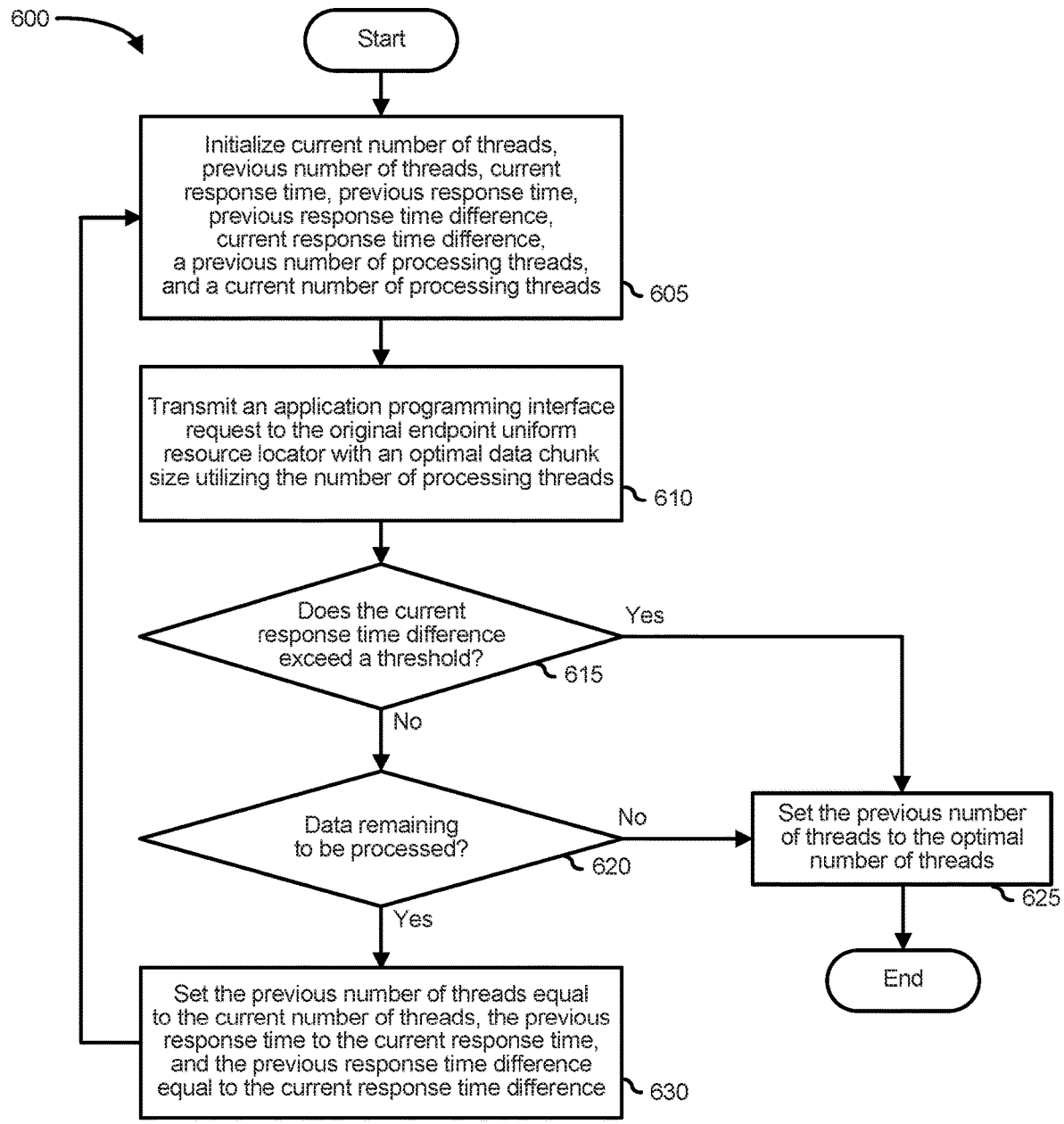
FIG. 6 is a flow diagram illustrating a method for determining an optimal number of threads for optimizing bulk data operations, according to at least one embodiment of the present disclosure.

FIG. 6 shows a flowchart of a method 600 that is a detailed illustration of block 535 of FIG. 5. The method typically starts at block 605 where the method initializes the values of various parameters associated with determining an optimal number of threads for parallel processing. For example, the method may initialize the values for the parameters associated with the method 600 that include a current number of threads parameter, a previous number of threads parameter, a current response time parameter, a previous response time parameter, a previous response time difference parameter, a current response time difference parameter, a parallel processing time difference threshold parameter, and a tripping parallel process to zero. The parallel processing time difference threshold parameter may also be referred to simply as a threshold. After initializing the values, the method proceeds to block 610.

At block 610, the method transmits a bulk API request to the original endpoint URL based on the current number of threads parameter. The bulk API request includes a data set of the optimal data chunk size from the initial data set. The method proceeds to block 615.

At block 615, the method receives a response to the bulk API request and determines the response time. The response time may also be referred to as the current response time. The method determines the difference between the current response time a previous response time which may be referred to as the current time response time difference. If the current response is the first response, the method may set the value of the threshold to the response time. The method determines whether the current response time difference exceeds the threshold. This may also refer to as determining the tripping parallel process or tripping number of threads. The method may set the value of the tripping parallel process accordingly. If the current response time difference exceeds the threshold, the method proceeds to block 625. Otherwise, the method proceeds to block 620.

At block 620, the method determines whether there are remaining data from the initial data set to be processed. If there is no remaining data to be processed, then the method proceeds to block 625. Otherwise, the method proceeds to block 630. At block 630, the method may set the previous number of threads to equal to the current number of threads. The method may also set the previous response time to the current response time. In addition, the method may set the previous response time difference equal to the current response time difference. The method proceeds to block 605. At block 625, the method may set the optimal number of threads equal to the previous number of threads. After setting the optimal number of threads, the method ends.

Figure 7:
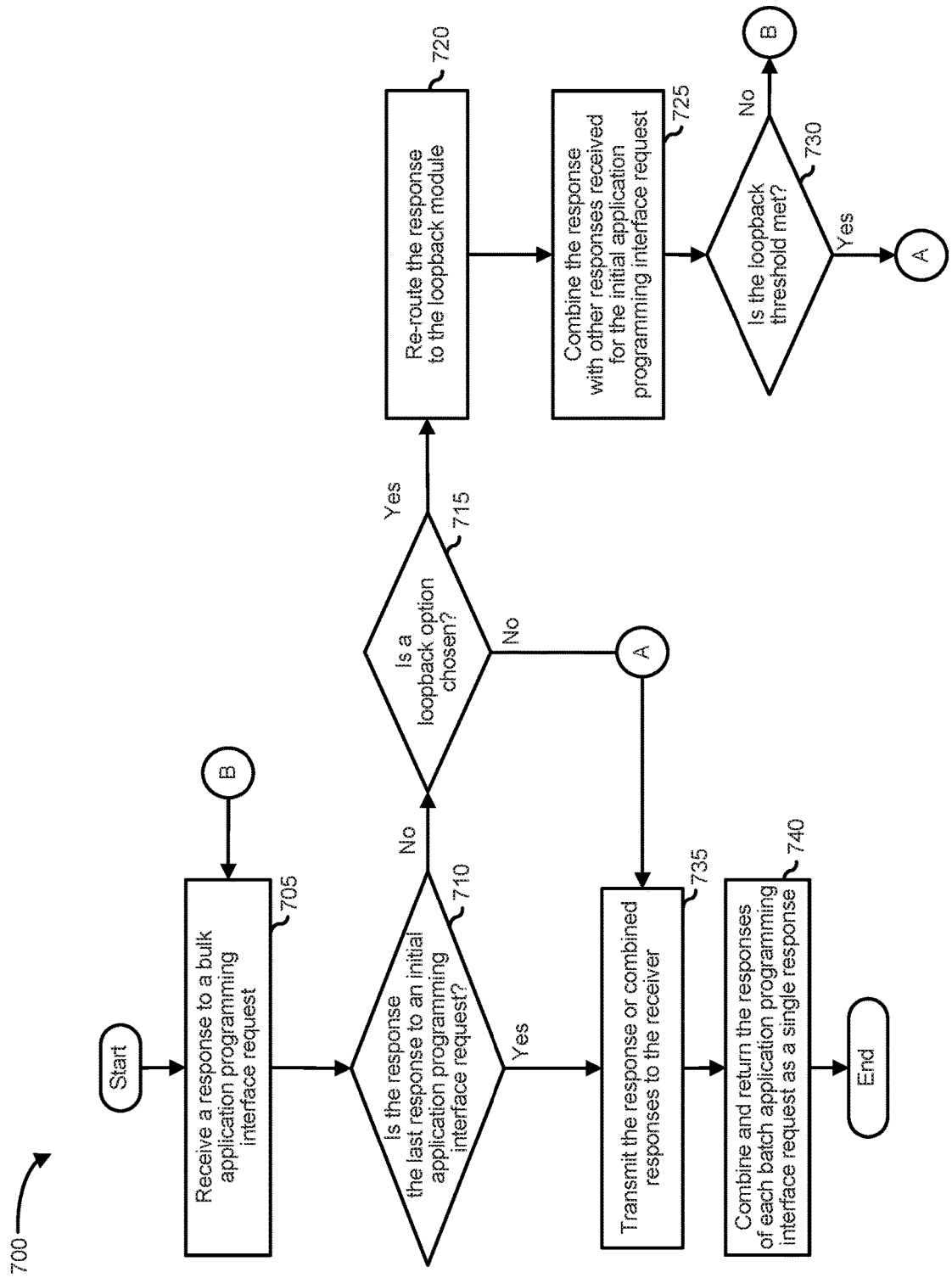
FIG. 7 is a flow diagram illustrating a method for receiving and processing responses for the bulk data operations, according to at least one embodiment of the present disclosure.

FIG. 7 shows a flowchart of a method 700 that is a detailed illustration of block 340 of FIG. 3. The method 700 may be performed by one or more components of FIG. 2. For example, call dispatcher 230 may perform blocks 705 and 735, call receiver 225 may perform block 740, and loopback module 235 may perform blocks 720, 725, and 735. The method typically starts at block 705 where the method receives a response to a bulk API request. The response may be one of several responses to bulk API requests based on an initial API request. The response may be received in the same order as the transmission of the bulk API requests. Each of the responses may include information that links the response to the other responses based on the initial API request. For example, each response may have the same transaction identifier, authorization code, etc. The method may also utilize a data structure such as an array, a collection, etc. to keep track of the bulk API requests and its responses. The method proceeds to block 710.

At block 710, the method determines whether the response is the last response to the initial API request. The response may determine if the response is the last response via various means such as via the information in the content-header, the data structure, the transaction identifier, etc. If the method determines that the response is the last response, then the method proceeds to block 735. Otherwise, the method proceeds to block 715.

At block 715, the method determines whether the loopback option has been chosen for the bulk operation associated with the initial API request. In one embodiment, the method may query the data store to retrieve the registration information. In another embodiment, the response may include information regarding the loopback option. For example, if the loopback option was chosen, then the response may include a loopback URL and/or the loopback threshold. If the method determines that the loopback option has been chosen, then the method proceeds to block 720. Otherwise, the method proceeds to block 735.

At block 720, the method re-routes the response to the loopback module. The method proceeds to block 725. At block 725, the method combines the response with other responses received associated with the initial API request. The method proceeds to block 730. At block 730, the method determines whether the loopback threshold is met. The loopback threshold is generally set during the registration of the endpoint URL. An administrator of the client may also update the registration information prior to the initial API request. The loopback threshold may be set to a certain percentage of the responses up to 100%. If the method determines that the loopback threshold is met then the method may proceed to block 735. Otherwise, the method may proceed to block 705. At block 735, the method transmits the response or the combined responses to the receiver. The method proceeds to block 740. At block 740, the method may combine the responses and return the combined responses as a single response to the client. After returning the responses to the client the method ends.

FIG. 8 shows an exemplary diagram 800 that includes a table 805 and a graph 810. Table 805 includes one or more rows such as row 815, 820, 825, 830, 835, 840, 845, and 850. Each row includes a number of records transmitted with a particular API request and a response time of the particular API request. Graph 810 is a graphical representation of table 805.

As shown, row 815 shows a response time of one second for an API request with 200 records and row 820 shows a response time of 1.25 seconds for an API request with 400 records. The difference between the response times of row 815 and row 820 is 0.25 seconds. Row 825 shows a response time of 1.32 seconds. The difference between the response times of row 820 and row 825 is 0.07 seconds. Table 805 includes rows that show the number of records sent with the API request and the corresponding response times after row 825 that are not referred herein for brevity and simplicity. Row 830 shows a response time 1.83 seconds for an API request with 1600 records. Row 835 shows a response time of 1.99 seconds for an API request with 1800 records. The difference between the response time of row 830 and row 835 is 0.16 seconds. Row 840 shows a response time of 2.45 seconds for an API request with 2000 records. The difference between the response times of rows 835 and row 840 is 0.46 seconds. Row 845 shows a response time of 2.99 seconds for an API request with 2200 records. The difference between the response times of row 845 and row 840 is 0.54 seconds. Based on the above, the response times from rows 815 through row 835 shows an incremental change of a fraction of a second. In addition, the response time from rows 835 through row 845 shows an incremental change of approximately half a second. However, the change in the response time between row 845 and row 850 is 1.53 seconds.

The increase in the response times suggests a deterioration of the performance of the endpoint server in correlation with the increase of the record sets of the API requests. Identifying the point where the performance of the endpoint server plunges also referred herein as the tripping point is critical in determining the optimal data chunk size for the API requests or simply the performance tripping point. The tripping point as used herein may be defined by the administrator according to a policy. For example, the administrator may define the tripping point as when the current response time is at least twice the previous response time.

Because of the deterioration of the performance around 1800 through 2000 records, these record sizes are candidates for the optimal data chunk size. Because the biggest drop in performance occurred at row 850 with 2400 records, the size of the record set prior to this drop may also be a candidate for the optimal data chunk size and be the ideal optimal data chunk size. However, the administrator may set a rule regarding maximum response time. In addition, a buffer associated with the maximum response time may be set by the administrator. For example, the maximum response time may be set to 3 seconds and the buffer is set to 0.02 seconds, therefore the response time of the optimal data chunk size should be less than 2.98 seconds. Because, the response time of row 845 is 2.99 seconds which exceeds the 2.98 seconds, the next candidate data chunk size of 2000 record set with a response time of 2.45 seconds may be chosen instead as the ideal candidate. The tripping point is also illustrated along with the response times in graph 810.

The optimizer may continue performing the optimization process several times after determining candidate data chunk sizes as shown in table 805 for verification. Because the response times continue to increase at an exponential rate after determining the tripping point, the candidate data chunk size initially identified as the ideal candidate may be verified as the optimal data chunk size. If the parallel processing option was chosen during registration, the optimizer may continue with the optimization process and determine the optimal number of threads for parallel processing as illustrated in FIG. 9 below.

FIG. 9 shows an exemplary diagram 900 that includes a table 905 and a graph 910. Table 905 includes one or more rows such as row 915, 920, 925, 930, and 935. Each row includes a number of threads used for a particular API request and a response time of the particular API request. Graph 910 is a graphical representation of table 905.

As shown, row 915 shows a response time of 2.5 seconds for a bulk API request with 2000 records utilizing a single thread, processing 2000 records. Row 920 shows a response time of 2.62 seconds for a bulk API request with 2000 records utilizing two threads, processing 4000 records. Row 925 shows a response time of 2.83 seconds for a bulk API request with 2000 records utilizing three threads, processing 6,000 records. Row 930 shows a response time of 3.2 seconds for a bulk API request with 2000 records utilizing four threads, processing 8,000 records. As shown, the changes in the response times for the above row are in a fraction of a second. However, row 935 shows a response time of 5.32 seconds for a bulk API request with 2000 records utilizing five threads, a change of 2.12 seconds which is several times larger than the previous changes of fraction of a second. Thus, the tripping parallel process in this example is four threads, which is the number of threads before the big change in the response time occurs. Graph 910 also shows the tripping point for the parallel process and response times in graphical format.

At this point, the optimizer has determined the optimal data chunk size and the optimal number of threads. The optimizer may update the registration information in the data store to include the optimal data chunk size and the optimal number of threads. During the analysis, the optimizer may have utilized several thousands of records from the initial data set. For example, if the initial data set has 100,000 records to process and the optimizer has utilized 10,000 records, the dispatcher processes the remaining 90,000 records by chunking the remaining records into the optimal data chunk size and utilizing the optimal number of threads. In another embodiment, if the parallel processing option was not chosen, the dispatcher may process the remaining 90,000 sequentially by chunking the remaining records into optimal data chunk size.

The above disclosure was utilized in a production setting with 21674 records to be processed. The optimizer utilized approximately 6000 records to determine the optimal data chunk size of 2000 records and the optimal number of threads of four. After determining the optimal data chunk size and the optimal number of threads, the dispatcher processed the remaining 15,674 records in 6.2 seconds. Prior to the current disclosure, processing 9,000 records takes 7 minutes. Thus, the current disclosure provides a big improvement in bulk operations.

In the flow diagrams of FIG. 3, each block represents one or more operation that can be implemented in hardware, software, or a combination thereof. In the context of software, the blocks represent computer-executable instructions that, when executed by one or more processors, cause the processors to perfume the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the method 300 is described with reference to FIG. 2 as described above, although other models, frameworks, systems, and environments may implement these processes.

Although FIG. 3 shows example blocks of method 300, in some implementation, method 300 may include additional blocks, fewer blocks, different blocks, or differently arranged blocks than those depicted in FIG. 3. Additionally, or alternatively, two or more of the blocks of method 300 may be performed in parallel. For example, although method 300 typically starts at block 305, if the original endpoint uniform resource located has already been registered, the method may start at block 310 instead. Above statements regarding FIG. 3 may apply to other figures illustrating methods in the current disclosure such as FIG. 4, FIG. 5, FIG. 6, and FIG. 7.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein. Also, the term "user" in this context and elsewhere herein is intended to be more broadly construed so as to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for optimizing a bulk data operation, the method comprising:
   receiving, by a receiver, an initial application programming interface request for the bulk data operation at a registered endpoint uniform resource locator from a client, wherein the registered endpoint uniform resource locator is associated with a transaction identifier and a flag to identify whether a loopback option or parallel processing is chosen by the client, and wherein a loopback threshold, which is a fraction of or all of responses to the initial application programming interface request, is identified when the loopback option is chosen;
   determining an optimal configuration for the bulk data operation, including an optimal data size and an optimal number of threads, wherein the optimal data size is based on a tripping point, wherein the tripping point is based on exceeding a threshold based on a difference between a current response time and a previous response time;
   subsequent to determining the optimal configuration, dividing the initial application programming interface request into a plurality of application programming interface requests, wherein each one of the application programming interface requests includes a data chunk based on the optimal data size, and wherein the each one of the application programming interface requests includes the transaction identifier which links the application programming interface requests to the initial application programming interface request;
   sending the application programming interface requests using the optimal number of threads for processing, wherein the each one of the application programming interface requests includes an identifier that links the application programming interface request to the initial application programming interface request received from the client;
   receiving a response for the each of the application programming interface requests;
   determining whether the parallel processing or the loopback option was chosen;
   in response to determining that the parallel processing was chosen sending the responses to the application programming interface requests to the receiver which combines the response for the each of the application programming interface requests into a single response based on the identifier prior to transmission to the client; and
   in response to determining that the loopback option was chosen, combining the responses to the application programming interface requests until the loopback threshold is reached into the single response based on the identifier prior to transmission to the client via the receiver.

2. The method of claim 1, in response to the determining that the parallel processing was chosen further comprising:
   using the optimal number of threads in executing the application programming interface requests in parallel prior to the sending the responses to the receiver.

3. The method of claim 1, in response to the determining that the loopback option was chosen further comprising:
   sending the response to a loopback module.

4. The method of claim 1, wherein the determining the optimal data size based on the tripping point includes determining a largest data size that an application program can handle before a response time exceeds the threshold.

5. The method of claim 1, further comprising registering a first uniform resource locator that includes choosing whether to opt for loopback and whether to opt for parallel processing.

6. The method of claim 5, further comprising subsequent to the registering the first uniform resource locator, generating a second uniform resource locator that is associated with a proxy server.

7. The method of claim 6, wherein the initial application programming interface request includes the second uniform resource locator.

8. The method of claim 5, further subsequent to the choosing to opt for loopback, generating a third uniform resource locator associated with a loopback module.

9. An information handling system comprising: a memory; and a bulk operation optimizer in communication with the memory and operable to:
   receive an initial application programming interface request to process a bulk operation at a registered endpoint uniform resource locator from a client wherein the registered endpoint uniform resource locator is associated with a transaction identifier and a flag to identify whether a loopback option or parallel processing is chosen by the client, and wherein a loopback threshold, which is a fraction of or all of responses to the initial application programming interface request, is identified when the loopback option is chosen;
   determine an optimal configuration for the bulk operation, including an optimal data size and optimal number of threads, wherein the optimal data size is based on a tripping point, wherein the tripping point is based on exceeding a threshold based on a difference between a current response time and a previous response time;

subsequent to determining the optimal configuration, dividing the initial application programming interface request into a plurality of application programming interface requests, wherein each one of the application programming interface requests includes a data chunk based on the optimal data size, and wherein the each one of the application programming interface requests includes the transaction identifier which links the application programming interface requests to the initial application programming interface request;

send the application programming interface requests for processing, wherein the each one of the application programming interface requests includes an identifier that links the each one of the application programming interface requests to the initial application programming interface request received from the client;

receive a response for the each one of the application programming interface requests;

determine whether the parallel processing or the loopback option was chosen;

in response to a determination that the parallel processing was chosen, send the responses from the optimal number of threads to the application programming interface requests to a receiver which combines the responses into a single response based on the identifier prior to transmission to the client; and in response to a determination that the loopback option was chosen, combine the each of the response for the application programming interface requests into the single response based on the identifier prior to transmission to the client.

10. The information handling system of claim 9, the bulk operation optimizer is further operable to determine an optimal number of threads to synchronously send one or more of the application programming interface requests.

11. The information handling system of claim 10, the bulk operation optimizer is further operable to send one or more application programming interface requests in parallel based on the optimal number of threads.

12. A system for optimizing a bulk operation, comprising:
a receiver to receive an initial application programming interface request for the bulk operation at a registered endpoint uniform resource locator from a client, wherein the registered endpoint uniform resource locator is associated with a transaction identifier and a flag to identify whether a loopback option or parallel processing is chosen by the client, and wherein a loopback threshold, which is a fraction of or all of responses to the initial application programming interface request, is identified when the loopback option is chosen;

a dispatcher to divide the initial application programming interface request into a plurality of application programming interface requests, wherein each one of the application programming interface requests includes a data chunk based on an optimal data chunk size and to dispatch application programming interface requests according to an optimal configuration, wherein the each one of the application programming interface requests includes an identifier that links the each one of the application programming interface requests to the initial application programming interface request; and a processor operable to receive the initial application programming interface request from the receiver and determine the optimal configuration that includes the optimal data chunk size based on a performance tripping point, wherein a current response time is at least twice a previous response time.

13. The system of claim 12, wherein the dispatcher is further configured to receive a response for each of application programming interface requests associated with the bulk operation.

14. The system of claim 13, wherein the dispatcher is further configured to transmit received response to a loopback module.

15. The system of claim 13, wherein the receiver is further configured to combine responses of the application programming interface requests into a single response prior to transmission to the client.

16. The system of claim 12, further comprising a status manager to provide information regarding a status of the bulk operation.

17. The system of claim 12, further comprising a loopback module that is configured to receive responses from the dispatcher and to combine the responses based on the loopback threshold.

18. The system of claim 17, wherein the receiver is further configured to receive responses from the loopback module.

19. The system of claim 12, further comprising a register module that is configured to process a request from the client to register an endpoint uniform resource locator.

20. The system of claim 19, wherein the register module is further configured to manage registration information associated with the endpoint uniform resource locator.

* * * * *